United States Patent
Lu et al.

(10) Patent No.: US 9,825,917 B2
(45) Date of Patent: Nov. 21, 2017

(54) SYSTEM AND METHOD OF DYNAMIC ISSUANCE OF PRIVACY PRESERVING CREDENTIALS

(71) Applicant: GEMALTO SA, Meudon (FR)

(72) Inventors: HongQian Karen Lu, Austin, TX (US); Laurent Castillo, Meudon (FR); Philippe Smadja, Meudon (FR)

(73) Assignee: GEMALTO SA, Meudon (FR)

( * ) Notice: Subject to any disclaimer, the term of this patent is extended or adjusted under 35 U.S.C. 154(b) by 11 days.

(21) Appl. No.: 14/654,547

(22) PCT Filed: Dec. 20, 2013

(86) PCT No.: PCT/EP2013/077613
§ 371 (c)(1),
(2) Date: Jun. 21, 2015

(87) PCT Pub. No.: WO2014/096325
PCT Pub. Date: Jun. 26, 2014

(65) Prior Publication Data
US 2015/0341340 A1    Nov. 26, 2015

(30) Foreign Application Priority Data
Dec. 21, 2012 (EP) .................................... 12306655

(51) Int. Cl.
*H04L 29/06* (2006.01)
*G06F 21/62* (2013.01)
(Continued)

(52) U.S. Cl.
CPC .... *H04L 63/0421* (2013.01); *G06F 17/30867* (2013.01); *G06F 21/34* (2013.01);
(Continued)

(58) Field of Classification Search
CPC ............. H04L 63/0421; H04L 2209/42; G06F 21/6254
See application file for complete search history.

(56) References Cited

U.S. PATENT DOCUMENTS

2007/0143860 A1    6/2007  Hardt
2008/0263649 A1    10/2008  Smadja et al.
(Continued)

OTHER PUBLICATIONS

Mostowski et al., "Efficient U-Prove Implementation for Anonymous Credentials on Smart Cards", 2012, pp. 243-260.*
(Continued)

*Primary Examiner* — Thaddeus Plecha
(74) *Attorney, Agent, or Firm* — The Jansson Firm; Pehr B. Jansson

(57) ABSTRACT

Method and System for enhanced privacy in privacy-preserving identity solutions. The technology provides for a redirect of a request to generate a proof of an attribute from a service provider to a separator. The separator removes source identification from the attribute-proof request and redirects the attribute-proof request, free of original source identification, to a credential issuer which issues the credential. A security device of the user generates a presentation token from the privacy-preserving credential and presents the presentation token to the service provider as proof of the attribute. Other systems and methods are disclosed.

10 Claims, 10 Drawing Sheets

(51) Int. Cl.
    *H04L 9/32*      (2006.01)
    *G06F 17/30*     (2006.01)
    *G06F 21/34*     (2013.01)
    *H04L 29/08*     (2006.01)

(52) U.S. Cl.
    CPC ...... *G06F 21/6254* (2013.01); *G06F 21/6263* (2013.01); *H04L 9/3234* (2013.01); *H04L 9/3263* (2013.01); *H04L 63/0815* (2013.01); *H04L 67/02* (2013.01); *H04L 2209/42* (2013.01)

(56) References Cited

U.S. PATENT DOCUMENTS

| | | | | |
|---|---|---|---|---|
| 2010/0275009 | A1* | 10/2010 | Canard | H04L 63/0421 713/155 |
| 2010/0325441 | A1 | 12/2010 | Laurie et al. | |
| 2011/0041165 | A1* | 2/2011 | Bowen | H04L 63/08 726/5 |
| 2011/0202991 | A1* | 8/2011 | Paquin | H04L 9/3213 726/9 |

OTHER PUBLICATIONS

International Search Report and Written Opinion dated Apr. 2, 2014 for corresponding International Patent Application No. PCT/EP2013/077613, filed on Dec. 20, 2013.
Claudio A. Ardagna et al.: "Enabling Privacy-preserving Credential-based Access Control with XACML and SAML", Computer and Information Technology (CIT), 2010, IEEE 10TH International Conference on, IEEE, Piscataway, NJ, USA, Jun. 29, 2010.

* cited by examiner

SYSTEM AND METHOD OF DYNAMIC ISSUANCE OF PRIVACY PRESERVING CREDENTIALS

BACKGROUND OF THE INVENTION

The present invention relates generally to digital security, and more particularly to dynamic creation of digital privacy-preserving credentials.

The proliferation of online services through the Internet has provided users with many exciting opportunities for electronic commerce, social networking, cloud computing, archiving of user data, email etc. Many such services deal with highly private and sensitive data. This information may include account numbers and balances, private details of a user's life, etc. Secure access to websites, secure communications channels, encryption and strong password policies serve to protect such information.

However, it's not only the data itself that a user may consider private, it is also the user's identity and online activities. For example, a person may want to access a web site only intended for certain categories of users and in so doing prove that she is a member of a qualifying category without revealing her identity. Furthermore, she may desire to keep private the fact that she is visiting a particular web site from third parties.

Federated identity solutions are intended to alleviate inconvenience for individuals who must manage the ever increasing number of passwords across websites, enable cross-domain collaborations, and enhance security of identity management. However, the achievement of these goals in added convenience for the users is often at the cost of user privacy. A third party identity provider, i.e., the third party that acts to verify a user's identity to a service provider web site to which a user seeks access, can learn about and track their users' behaviors, such as where and when they have visited particular sites and even their activity at those sites. For Internet identity providers, this is often the principal mechanism with which to monetize the identity services they provide and lies at the core of their offers. The identity provider may disclose more personal information than needed to service providers without users being aware of such disclosure.

Anonymous credential (or privacy-preserving credential) systems, such as Microsoft's U-Prove and IBM's Identity Mixer (Idemix), enable authentication and access control while protecting users' privacy. For this purpose, these systems prevent the linkage of the issuance and usage of credentials and enable selective disclosure of information in the credentials. For example, a privacy-preserving credential may be used to prove a particular attribute of a user, e.g., the user's age, without revealing the actual identity of a user. Even if the identity provider and service providers collude, they cannot track user behavior. Cryptography provides a strong foundation for both U-Prove and Idemix. However, effectively integrating the technologies into the identity ecosystem with security, privacy and usability is still a challenge.

In one scenario, a user may want to access a service provider (SP) over the Internet and also want to protect her privacy at the same time. A service provider (SP) is a web site that provides some form of service to a user, e.g., electronic commerce, cloud computing or social networking. To allow access to the service, the SP requests the user to present a credential issued by a trusted credential issuer, also referred to as an identity provider (IdP). If the user already has the credential, he/she can present the credential with selective disclosure and other privacy protection features. However, if the user does not have the credential, she needs to obtain it somehow. For a better user experience, the SP may direct the user to procure the credential dynamically and revisit the SP after the credential has been obtained. Using existing identity federation protocols provides security and seamless user experience, but at the same time using them defeats the purpose of the privacy-preserving credential because the IdP can learn which SP that the user came from.

Microsoft Corporation provides the U-Prove privacy-preserving credential technology. *U-Prove Cryptographic Specification, V*1.1, C. Paquin, Microsoft, February 2011. Microsoft has demonstrated a mechanism of using a U-Prove Agent to address the aforementioned concerns.

A U-Prove Agent provides a mechanism to separate the retrieving of information from trusted organizations from the release of this information to the destination website. *U-Prove CTP R2 Whitepaper, Rev* 17, J. Brown, P. Stradling, C. H. Wittenberg, Microsoft, February, 2011.

The underlying U-Prove cryptography prevents the issuing organizations from tracking where or when the user uses this information. The U-Prove Agent is composed of a cloud-hosted service and optional client components. The Agent (including the client components) acts on the user's behalf to:

1. Interact with the credential issuer to generate a U-Prove token and
2. Compute a presentation proof and send the presentation token to the service provider.

A drawback of this approach is that the U-Prove Agent learns many details; the U-Prove Agent can track from which service provider the user has used a credential, at what time such use occurred, which credential was used, who issued the credential, and so on. Providing the U-Prove Agent so much information, in some aspect, has defeated the purpose of the privacy-preserving credential.

From the foregoing it will be apparent that there is still a need for an improved method to provide dynamic issuance of user credentials that do not reveal a user's identity as well as that does not reveal user behavior in their online activities. Thereto the present invention proposes a method for authenticating a user, operating a web application, for example, a web browser, on a host computer, to a web-based service provider service, characterised in that it comprises redirecting a request to generate a credential from a service provider to an identity provider via a separator, by:
  transmitting a first request for a credential to the separator;
  operating the separator to transmit a second request for the credential to the identity provider without identifying the service provider as originator;
operating the identity provider and a security device associated with the user to engage in a privacy-preserving credential creation exchange in cooperation with the identity provider;
operating the security device to generate a presentation token from the privacy-preserving credential; and to present the presentation token to the service provider as proof of the attribute.

According to another aspect of the invention, the request to generate a credential may be preceded by operating the service provider to request proof of an attribute from the user; may further comprise transmitting a token-issued status-message from the identity provider to the web application; operating the host computer to redirect the token-issued status-message to the separator; operating the separator to redirect the token-issued status-message to the service provider via the host computer; and wherein the step of operating the security device to create a presentation token from the privacy-preserving credential may be preceded by operating the service provider, in response to receiving the token-issued status-message, to repeat the request for proof of an attribute from the user.

According to another aspect of the invention, it may further comprise operating the service provider to verify the presentation token and to provide access to the service provider service.

According to another aspect of the invention, it may further comprise operating the security device to store the privacy-preserving credential or the presentation token.

According to another aspect of the invention, the security device may be a smart card.

According to another aspect of the invention, the credential may be a U-Prove privacy-preserving credential.

According to another aspect of the invention, the credential may be an Identity Mixer (idemix) credential and the presentation token may be a transformation of the idemix credential.

The invention also provides a system for protecting the privacy of a user of online information services, characterized in that it comprises a host computer operating under the control of a web browser by which a user accesses a web service executing on a service provider server; a personal security device connected to the host computer and programmed to generate and store privacy-preserving credentials and to generate presentation tokens from the credential in response to receiving a request including a policy of the web service; wherein the service provider is programmed to generate a credential request that redirects to a separator via the web browser executing on the host computer; wherein the separator comprises a web server that is programmed to receive a credential generation request and to create a second credential generation request, wherein the separator returns the second credential generation request to the web browser and wherein the second credential generation request redirects the web browser to an identity provider; and wherein the identity provider comprises a web server operable to engage in a credential generation protocol with the personal security device.

The invention also provides a web server computer having a processor and a memory, the memory comprising instructions to cause the web server to receive a first request to generate a privacy-preserving credential from a web browser characterized in that the first request originates with a service provider and is redirected to the web server via a web browser executing on a host compute; in response to receiving the request to generate a privacy-preserving credential, creating a response in the form of a second request to generate a privacy-preserving credential wherein the second request redirects the web browser to an identity provider directing the identity provider to engage in a credential issuance protocol with a personal security device connected to the host computer; and transmitting the second request to the web browser in response to the first request.

According to another aspect of the invention, the web server computer may further comprise instructions to cause the web server to receive a first token-issued status message from the identity provider transmitted via the web browser and in response to receiving the token-issued status message to creating a second token-issued status message and transmitting the second token-issued status message to the web browser wherein the second token-issued message is designed to redirect to the service provider thereby indicating to the service provider that the personal security device has generated the credential.

DETAILED DESCRIPTION OF THE INVENTION

Figure 1:
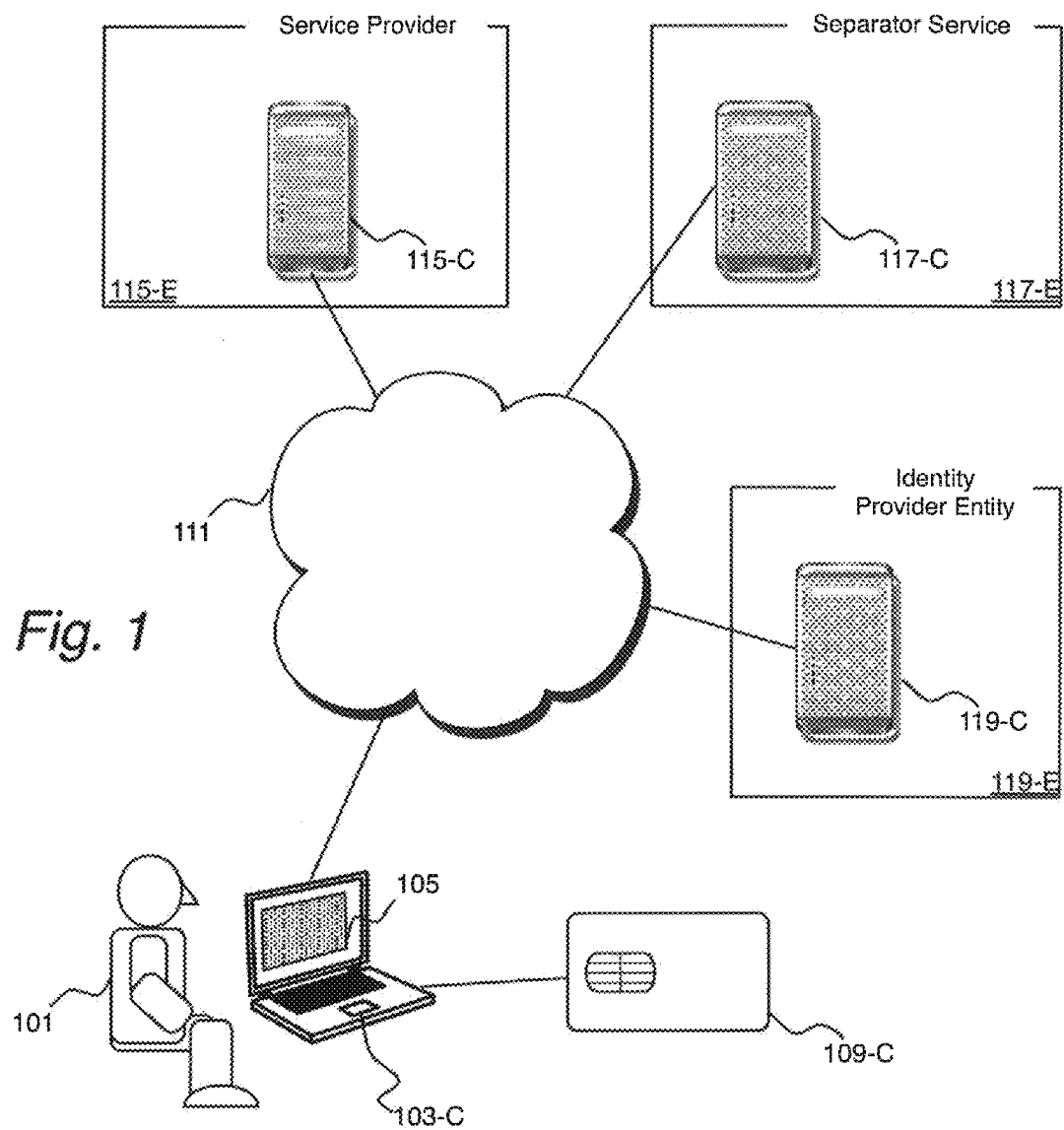
FIG. 1 is a schematic illustration of hardware aspects of a network connecting a host computer with a portable security device, e.g., a smart card, connected thereto, to one or more remote server computers in an identity ecosystem.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

In the following description several related elements are referred to a n-E, n-C, and n-S, respectively. E stands for entity, C, for computer, and S, for software. Thus, n-E is the entity n-E, that operates the computer n-C, which executes according to instructions n-S. For example, Service Provider 115-E operates a computer 115-C which executes a web service 115-S. For ease of description, it is sometimes referred to these elements by the number n, e.g., service provider 115. Unless the context makes the contrary clear, this should typically be taken to mean that a reference to all three elements performing their respective roles, e.g., that the service provider computer 115-C performs some action prescribed by the software in the web service program 115-S.

In an embodiment of the invention, a method and system is described that provides for use of privacy-preserving credentials, e.g., as provided by U-Prove or Idemix, without revealing to identity providers how the user intends to use the privacy-preserving credential provided via the identity provider.

FIG. 1 is a schematic illustration of hardware aspects of a network 111 connecting a host computer 103-C with a portable security device 109-C, e.g., a smart card, connected thereto, to one or more remote server computers. These remote server computers include a server computer 115-C of a service provider 115-E, a server computer 117-C of a separator service 117-E, a server computer 119-C of an identity provider entity 119-E. The host computer 103-C is operated by a user 101 who interacts with services running on one or more of the server computers via a web browser window 105 of a web browser 103-S executing on the host computer 103.

Figure 2:
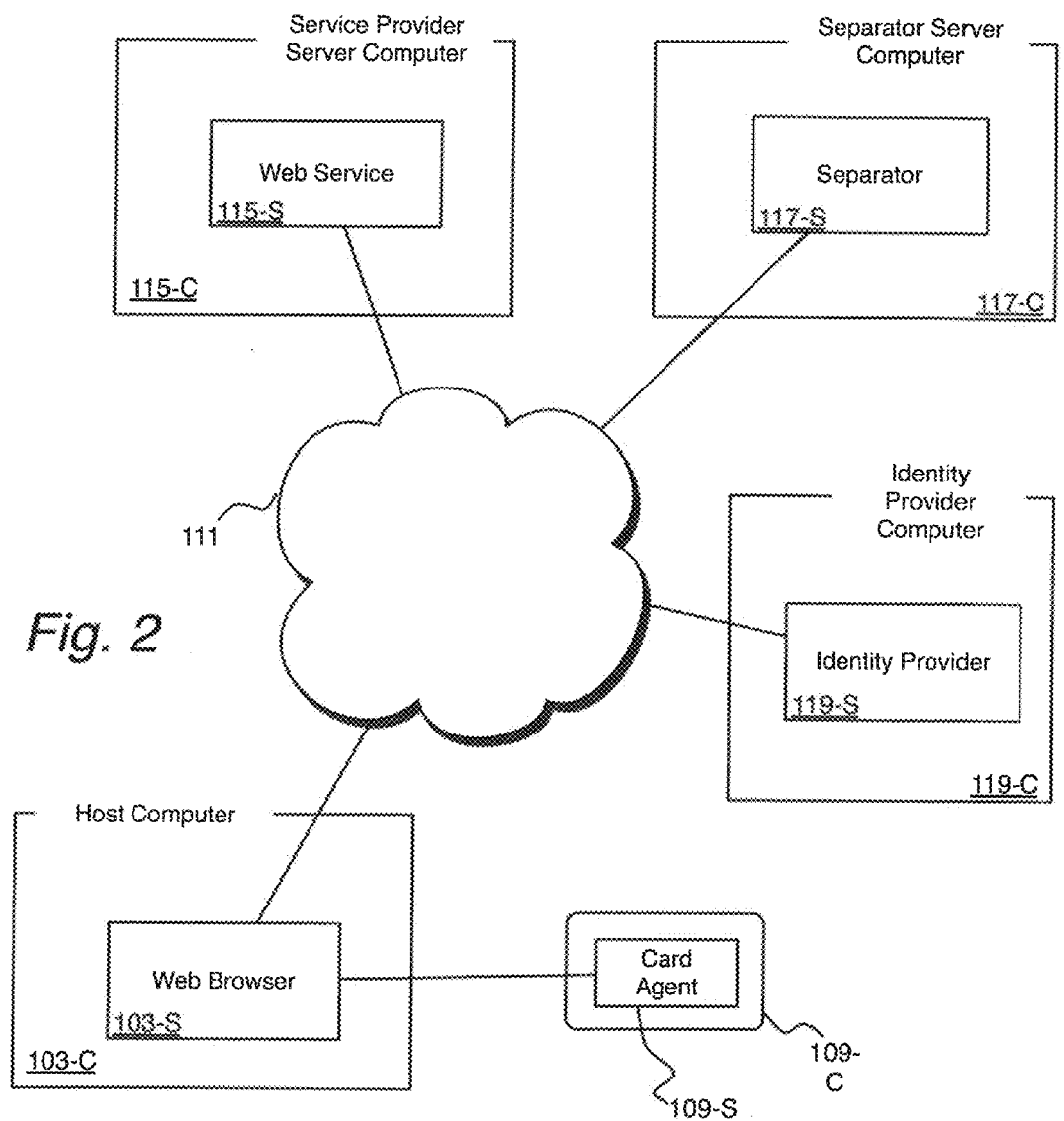
FIG. 2 is a schematic illustration of software programs corresponding to the hardware nodes of FIG. 1.

FIG. 2 is a schematic illustration of software programs corresponding to the hardware nodes of FIG. 1. As noted above, the user 101 interacts with a web service 115-S executing on the service provider server computer 115-C. The role of the separator 117-S executing on the separator server compute 117-C and the identity provider 119-S executing on the identity provider computer 119-C are described herein below.

In the example scenario illustrated in FIG. 1, the smart card 109 provides the cryptographic operations on behalf of the user 101, e.g., to cryptographically sign documents, to decrypt messages or to perform a cryptographic operation as part of a challenge-response authentication mechanism. The smart card also executes a card agent program 109-S which provides part of a functionality referred to herein below as user agent.

Each of computers 103-C, 115-C, 117-C, and 119-C may have typical components of a computer, e.g., a central processing unit capable of executing instructions stored on a storage device and memory used during execution of programs. Details of such architectures are generally known and not necessary to the understanding of the present discussion. In one scenario, the computers n-C have their respective software programs n-S stored on a storage device of the computer n-C. An operating system of the computer n-C loads the software program n-S to be executed by the processor of the computer n-C. Herein, language such as "web browser 103 sends a message X to service provider 115" is used as a short-hand description of the actions taken by the various processors executing program instructions. Thus, the example phrase in the previous sentence could be interpreted to mean that the software instructions of the web browser 103-S is executed to cause the processor of the host computer 103-C to transmit the message X to the service provider server computer 115-C which operates under the instructions of the web service program 115-S.

Figure 3:
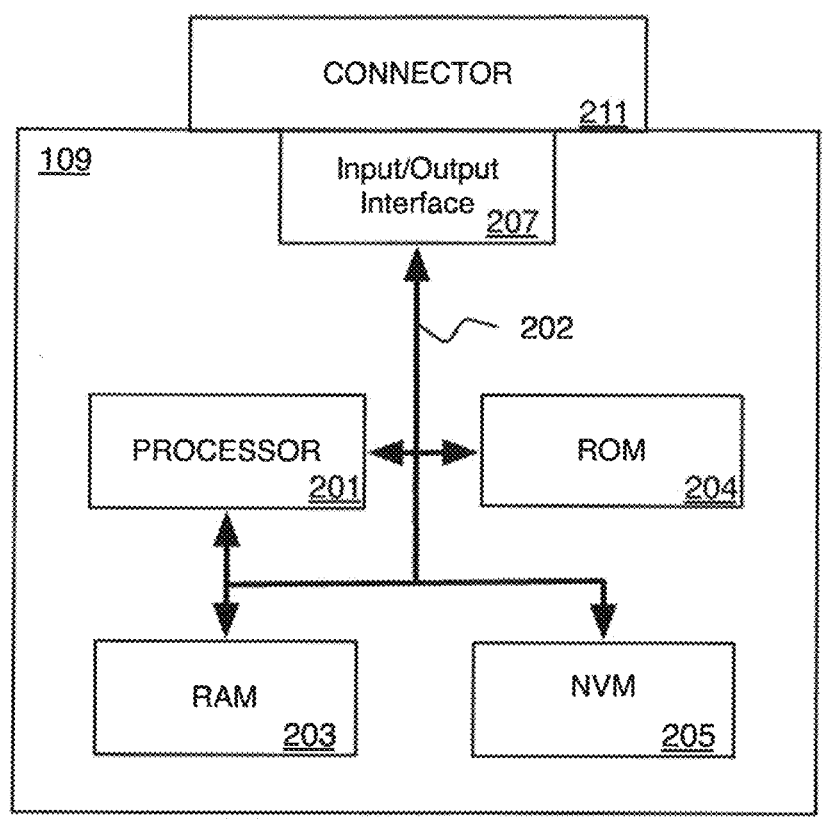
FIG. 3 is a schematic illustration of a security device 109, for example, a smart card.

FIG. 3 is a schematic illustration of a security device 109, for example, a smart card. The portable security device 109 may include a processor 201 connected via a bus 202 to a random access memory (RAM) 203, a read-only memory (ROM) 204, and a non-volatile memory (NVM) 205. The portable security device 109 further includes an input/output interface 207 for connecting the processor 201, again typically via the bus 202, to a connector 211 by which the portable security device 109 may be connected to the host computer 103.

In alternative embodiments, the connection between the host computer 103 and the portable security device 109 is wireless, for example, using near-field communication (NFC) or other radio or microwave communications technologies.

Figure 4:
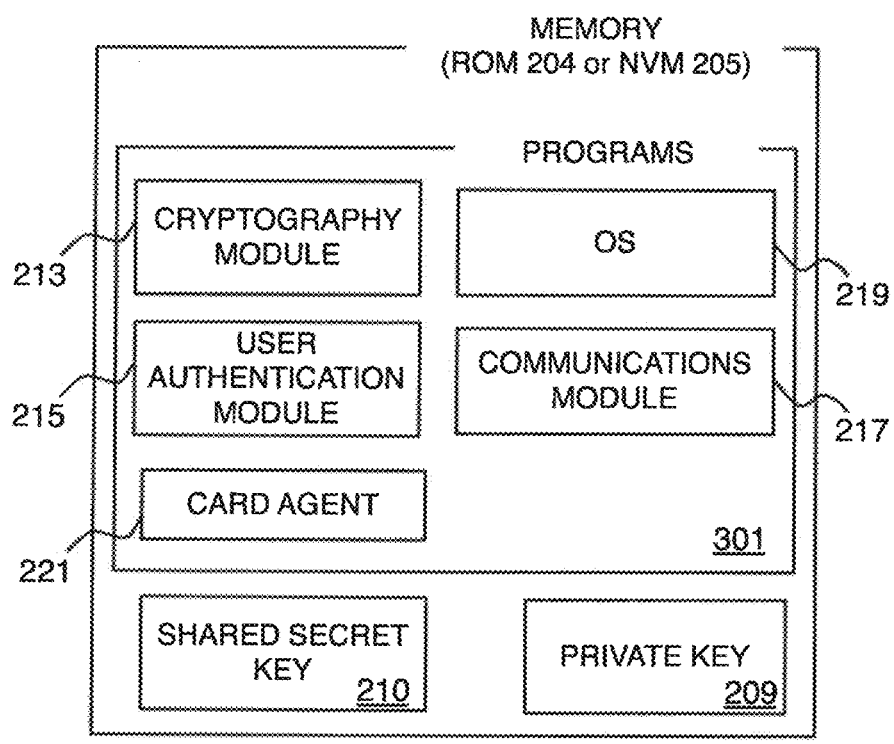
FIG. 4 is a block diagram illustrating certain software programs loaded on the security device of FIG. 3.

The NVM 205 and/or ROM 204 may include computer programs 301 as is illustrated in FIG. 4. While it is here depicted that the computer programs 301 are all co-located in the ROM 204 or the NVM 205, in actual practice there is no such restriction as programs may be spread out over multiple memories and even temporarily installed in RAM 203. Furthermore, the portable security device 109 may include multiple ROMs or NVMs. The programs 301 include operating system programs as well as application programs loaded on to the portable security device 109. The NVM 205 or ROM 204 may also contain private data, such as a private key 209 or a shared secret key 210, stored either in its basic form or in derived quantities.

The portable security device 109 programs 301 may include a cryptography module 213, a user authentication module 215, a communications module 217, and the operating system OS 219. The portable security device 109 programs 301 may further include a card agent 221 for causing the portable security device 109 to perform the tasks of the portable security device 109 described herein, for example, to negotiate a credential issuance protocol to generate a privacy-preserving credential.

According to NIST's Electronic Authentication Guideline, a credential is "an object or data structure that authoritatively binds an identity (and optionally, additional attributes) to a token possessed and controlled by a subscriber" NIST, "Electronic Authentication Guideline," NIST Special Publication 800-63-1 (Draft 3), June 2011. An authority, e.g., identity provider (IdP) 119, issues a credential to a user 101. Examples of credentials include username and password or an X.509 certificate and its corresponding private key.

An anonymous credential allows a user to prove to a service provider (SP) that the credential contains the required attributes without revealing the information stored inside the credential. For example, the user can prove that she is over 18 without revealing her date of birth. The anonymous credential, hence, both proves the attribute at question while also protecting the user's privacy. An anonymous credential technology enables one to build a privacy-enhancing identity system that separates the credential issuance and credential usage.

The identity provider (IdP) 119 is the credential issuer. It is trusted by users 101 and service providers 115. The IdP 119 knows or can learn about users' identity information, and may verify the information. Although some anonymous credential technology, such as Idemix, allows users to hide certain attributes from the IdP 119, the IdP 119 still knows some identity information about the user and, hence, can vouch for the information. In a privacy-enhancing identity system, the IdP 119 does not know the identifier of a credential it has issued. The user, operating the host computer 103 and the security device 109 creates the identifier. This process ensures the identifier cannot be traced.

Being able to hide attributes from the IdP 119 is useful both for domain specific credentials and if the user wants to choose a pseudonym without revealing it to the credential issuers. Otherwise, the credential issuer and the IdP may collude to trace pseudonyms and get the identity(ies) related to that pseudonym.

Figure 5:
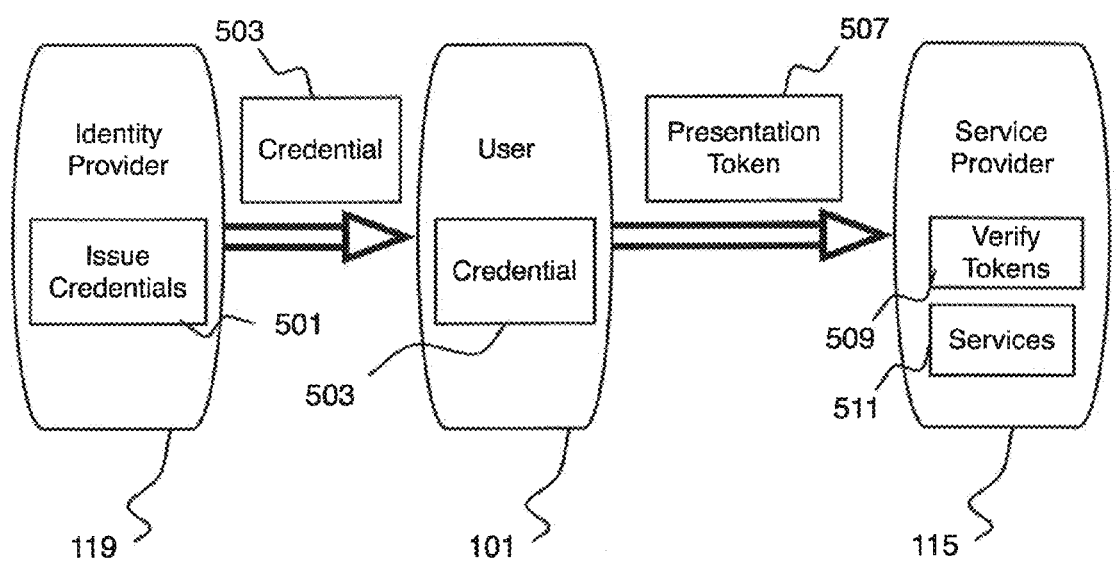
FIG. 5 is a block diagram illustrating the issuance and use of a privacy-preserving credential.

FIG. 5 is a block diagram illustrating the issuance and use of a privacy-preserving credential. The identity provider 119 issues the credential 503, step 501. The user 101 stores the credential 503. This may be on the user's host computer 103 or on the security device 109. The user produces a presentation token 507 from the credential 503 and presents it to the service provider 115. The service provider 115 verifies the presentation tokens presented to it, step 509, and provides web services 511.

The identity provider (IdP) 119 issues credentials to end users 101. The credential issuance is an interactive process between the IdP 119 and the user 101 (through the user agent). The user agent may be a combination of software known as the card agent 221 and software executing on the host computer 103, e.g., within the web browser 103-S. At the end of the protocol, the user's security device (e.g. smart card) 109 has the credential token 503 and stores it in the device's secure memory.

The service provider (SP) 115 verifies user's credential before providing requested services 511. For a privacy-enhancing identity ecosystem, the user 101 does not provide her credential to the SP directly. Instead, the SP specifies its access control policy and the user proves that she satisfies the policy requirements without presenting the credential directly. For this purpose, the user presents a presentation token 509 that the SP 115 can verify 509.

The user, via her security device 109, generates a presentation token 507 from the credential 503 based on the policy of the SP 115 and presents the token to the SP. The presentation token could be, for example, a UProve presentation proof, Idemix proof, or a signed mERA-based credential.

The SP 115 verifies the presentation token 507, step 509. The SP 115 may also need to check if the credential 503 is fresh (in case of a single use credential) or if the number of permitted uses is not already exceeded (in case of a multi-use credential). The solution varies depending on whether the credential 503 is SP-specific or not.

The user 101 interacts with entities over the Internet via the user agent that may include user's web browser 103-C, smart card 109, and other hardware or software acting on the user's behalf. The user (through a user agent) obtains a credential 503 from the IdP 119 and uses the credential 503 at various SPs in the form of presentation tokens 507 created based on the particular policies of the SPs 115.

The user's security device 109 obtains the credential 503 from the IdP 119 using a credential issuance protocol. At the end of the protocol, the security device 109 generates or obtains the credential 503.

The user 101 uses the credential when interacting with a SP 115. The smart card 109 generates a presentation token 507 from the credential 503 based on the requirements of the SP 115.

There are two types of interaction flows in terms of credential token issuance and usage: pre-issuance and on-demand issuance.

In a pre-issuance flow, the user 101 first initiates obtaining the credential token from the IdP 119, after which the user 101 uses the token with service provider 115. This flow completely separates the token issuance and the token usage and thus preserves the privacy features offered by the underlying cryptography. This process better approximates the typical, more familiar paperwork patterns of the physical world where a user obtains a credential, such as a driver's license or medical insurance card from a granting authority, and then the credential is used when needed after it has been granted. The current online world, however, often operates in the mode of getting an identity credential only at the moment when it is needed.

In on-demand flow, the user 101 commences by visiting a service provider (SP) 115 web service which asks the user 101 to present a certain credential. In the on-demand-flow scenario, neither the user 101 nor the security device 109 of the user already has the required credential to satisfy the requirements of the SP 115. The SP 115 directs the user to get the credential dynamically from an IdP 119, which may be determined by the SP 115 or by the user 101 depending on the circumstance. The user 101 agreeing to obtain the credential 503 from the IdP 119—by clicking a link, for example—may be considered as consent by the user. Some use cases, though, may require more explicit user consent. After getting the credential token, user then returns to the SP 115 to present the token as a presentation token 507.

Once the user 101 obtains the credential 503, the user 101 may reuse the credential 503 and could also use the credential 503 with different and non-related SPs 115. Thus, after obtaining the token, the usage of the credential 503 becomes the same process as the pre-issuance flow case.

Figure 6:
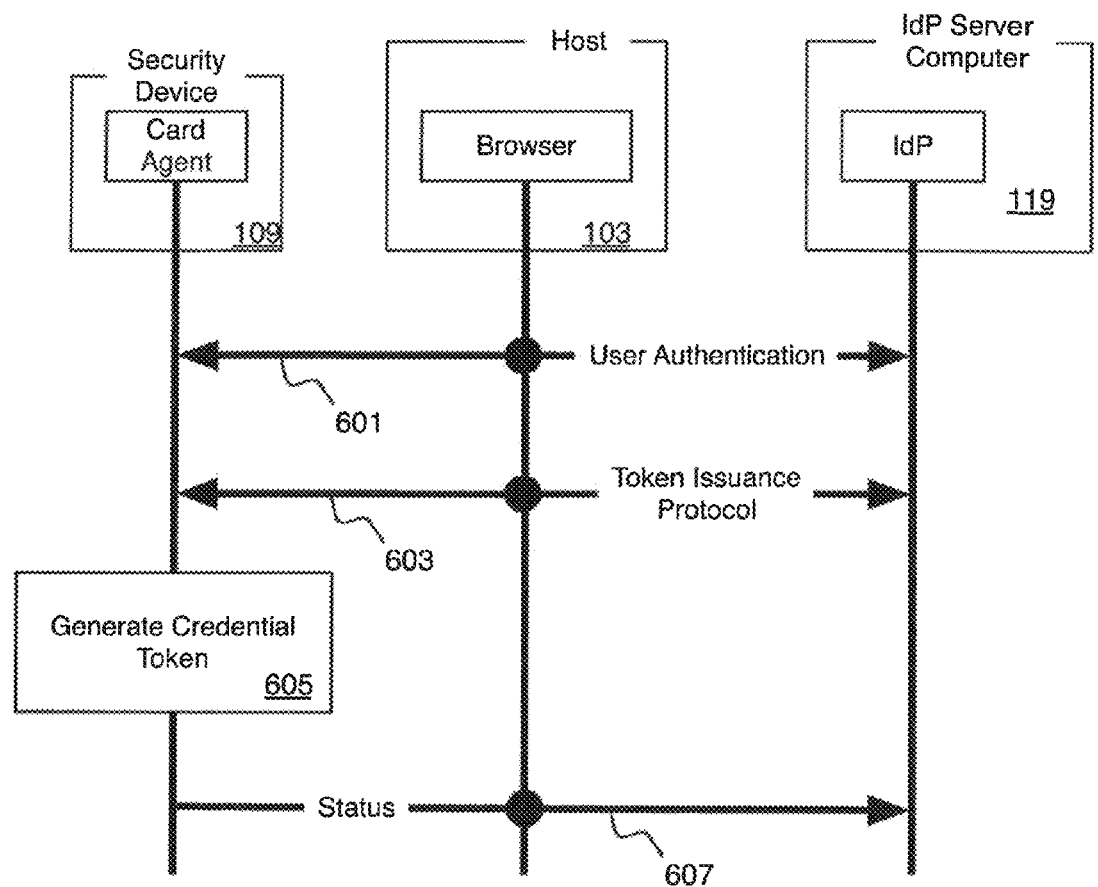
FIG. 6 is a timing sequence diagram illustrating the data-flow in a pre-issuance scenario.

FIG. 6 is a timing sequence diagram illustrating the data flow in a pre-issuance scenario. In the pre-issuance flow, the token (credential) issuance and token usage are separated. The token can be used with multiple SPs without the SPs registering with the card. The card has one or a few tokens, which include various attributes. The cardholder decides what to reveal to the SP. In this case, the user goes to the IdP 119 to obtain a token. He then goes to various SPs and uses the token.

The user approaches the IdP 119 to obtain a credential and engages in a user authentication exchange, step 601. User authentication may involve the user's security device 109. Next the security device 109 and the IdP 119 engage in a Token Issuance Protocol, step 603. An example of a token issuance protocol is the U-Prove token issuance protocol described in Christian Paquin, "U-Prove cryptographic specification," v1.1, Microsoft Corporation, February 2011. http://connect.microsoft.com/site1188/Downloads/DownloadDetails.aspx?DownloadID=33 918, accessed on Dec. 16, 2012. Upon conclusion of the token issuance protocol exchange 603, the security device 109 generates the credential token, step 605, after which the user agent, in this case the security device 109, communicates a status message 607 to the IdP 119 indicating that the credential token has been created. The exchanges between the security device 109 and the IdP 119 may occur via the web browser 103 as indicated by the solid circular dots in FIG. 6.

Figure 7:
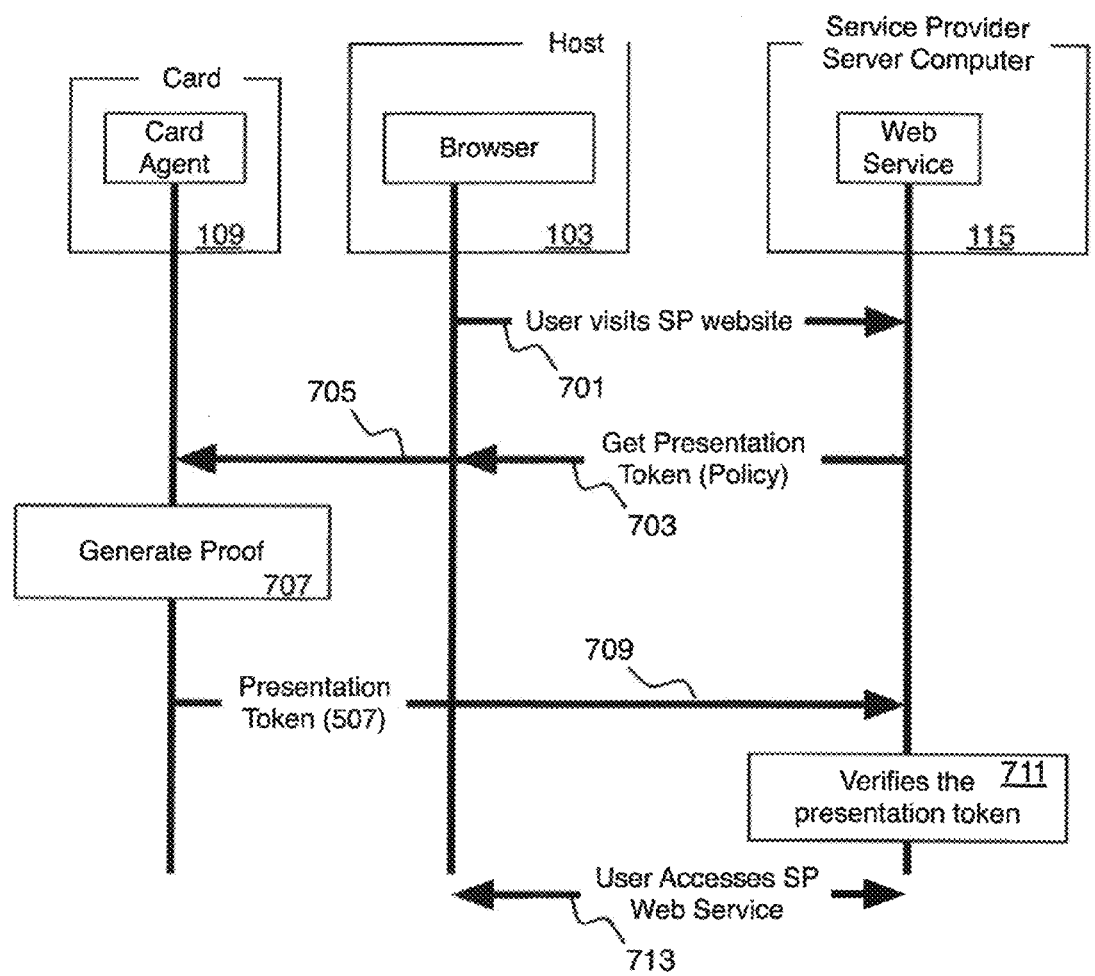
FIG. 7 is a timing sequence diagram illustrating the use of a credential and presentation token generated therefrom.

FIG. 7 is a timing sequence diagram illustrating the use of a credential and presentation token generated therefrom. The user 101 starts out by visiting a web service 115, step 701. The web service 115 responds to the browser with a request for a presentation token satisfying a specified policy, step 703.

The browser 103 forwards this token request to the security device 109, step 705. The security device generates the required proof, step 707, in the form of a presentation token 507, and forwards the presentation token to the web service 115, step 709.

The web service 115 verifies the presentation token, step 711, and if all is OK in regard thereto, i.e., the presentation token satisfies the authorization policy of the web service 115, the web service grants the requested access, step 713.

The on-demand flow is similar to the Web single sign-on (SSO). With the on-demand flow, it is very difficult, if not impossible, to completely separate the token issuance and the token usage because time correlation is always possible. Therefore, untraceability is difficult to achieve.

There is more than one way to design the on-demand issuance flow. Each has its advantages and disadvantages. It is desirable in the on-demand flow to separate the credential issuer (IdP) 119 from the service provider (SP) 115. One way to achieve that is to use a remote agent 117, referred to herein as the separator 117. The separator 117 is described in greater detail herein below. This method enables on-demand issuing of privacy-preserving credentials, separates service providers from the credential issuer (e.g., identity provider IdP 119), and achieving privacy goals while providing a seamless user experience. The principle components of the process are the secure device 109 (for example, a smart card), the separator 117, and performing a double redirect of credential requests or presentation token requests.

1. The security device 109 keeps the user's private keys, generates and stores the user credential (token), and computes the presentation proofs (presentation token).
2. The separator 117 is hosted by a trusted third party (separator service 117-E) that separates the SP 115 from the IdP 119 so that the IdP 119 does not know which SP 115 that the user 101 has interacted with or when said interaction took place. The separator 117 knows the SP 115 and the IdP 119. However, the separator 117 does not know who the user 101 is and does not know the user's credential 503.
3. The double redirection of message flow is the mechanism of the separation.

Figure 8:
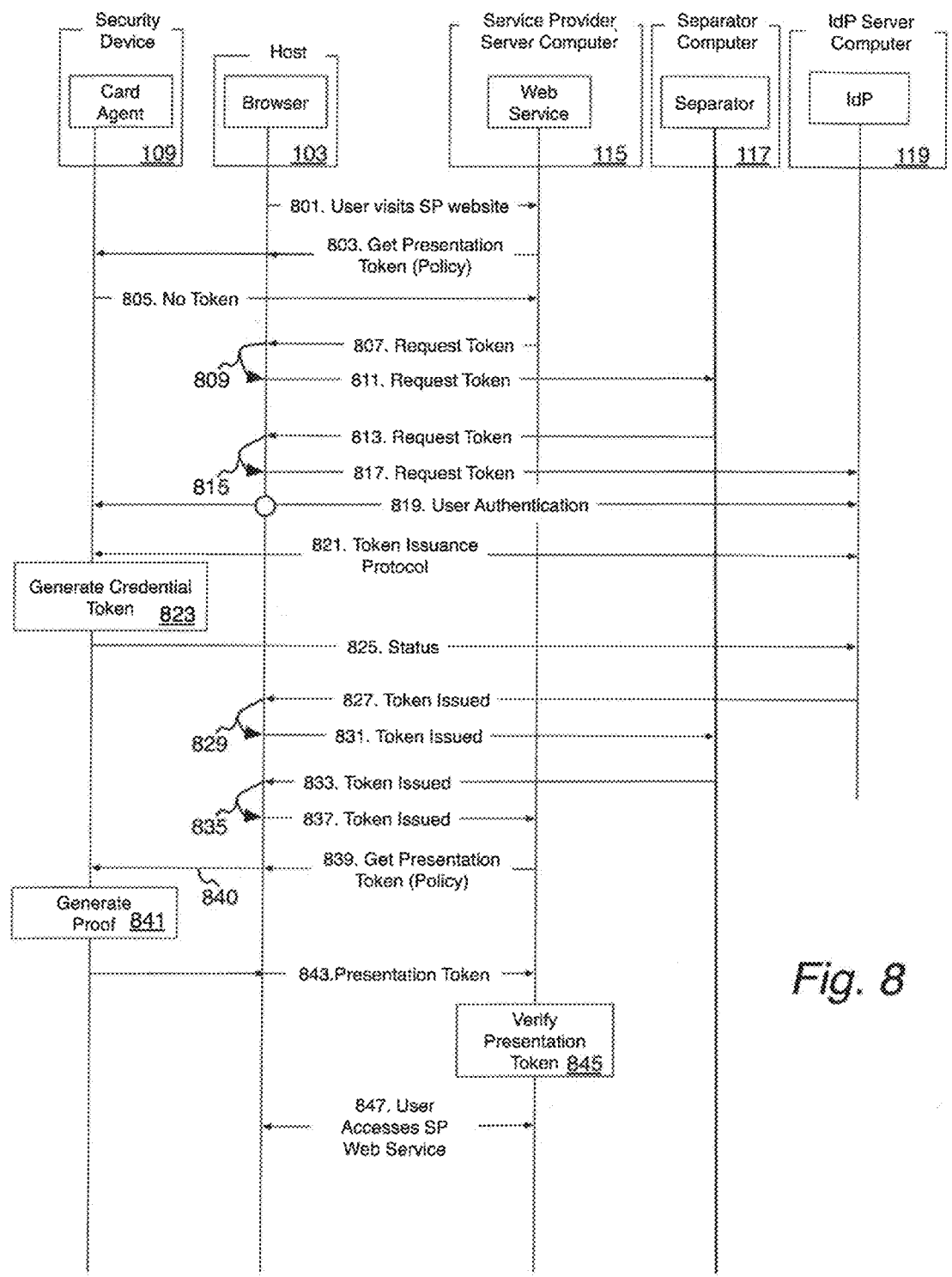
FIG. 8 is a timing sequence diagram illustrating a method involving double redirects of token request from the service provider via a separator.

FIG. 8 is a timing sequence diagram illustrating a method involving double redirects of a token request from the service provider via a separator. For security, all communications over the Internet should use a secure protocol, e.g., SSL/TLS.

Step 801: A user 101 visits the SP web service 115 through a web browser 103.

Step 803: The SP 115 requests certain attributes of a user's credential (called presentation token) by specifying a policy (also called criteria). This presents two possible scenarios: first, the trivial case in which the user has a credential 503 and therefore already has the ability to generate the required proof and present it in a presentation token, and second, where the user does not have the credential 503 and must procure one. The subsequent discussion of the remaining FIG. 8 process which follows herein describes the flow for the second case.

Figure 9A:
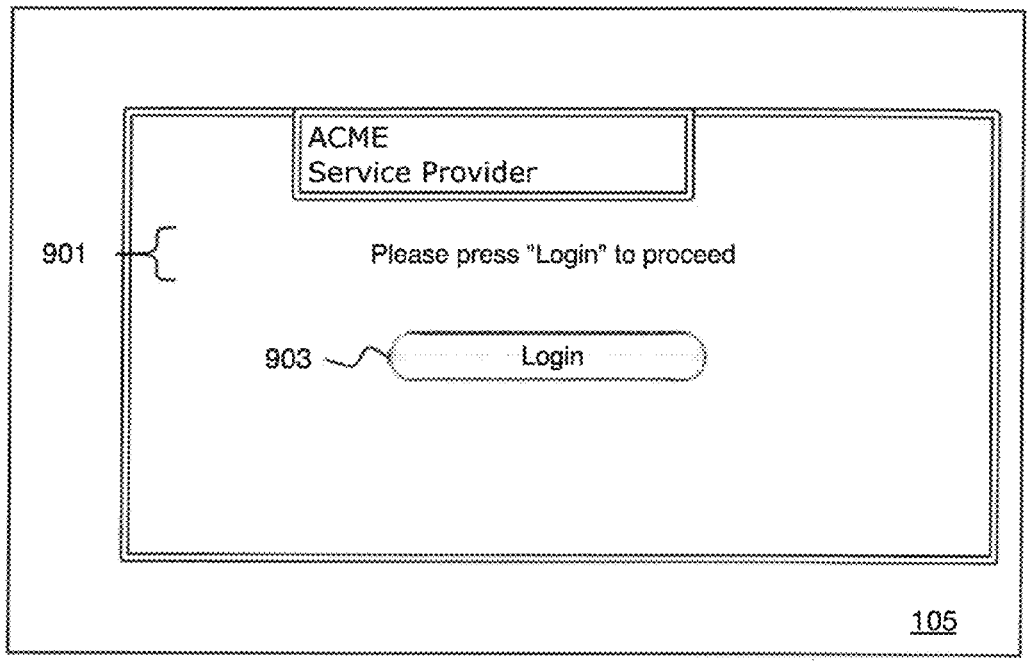
FIGS. 9a-9d illustrate a sequence of possible web browser interaction screens indicating the user interaction during double redirects as set forth in FIG. 8.

The interaction between the user 101 and SP 115 web service via the browser 103 is depicted in FIG. 9*a*. The SP 115 displays a text 901 asking the user 101 to login and provides a button 903 to press when ready. If the user has a credential 503, the required presentation token is generated, and the login procedure may proceed. That scenario, being a trivial case, is not presented in FIG. 8.

It should be noted that the user interaction through the user-interface screens 9*a* through 9*d* are merely one example of a possible flow. For example, in other alternatives, the flow may be more automated.

Figure 9B:
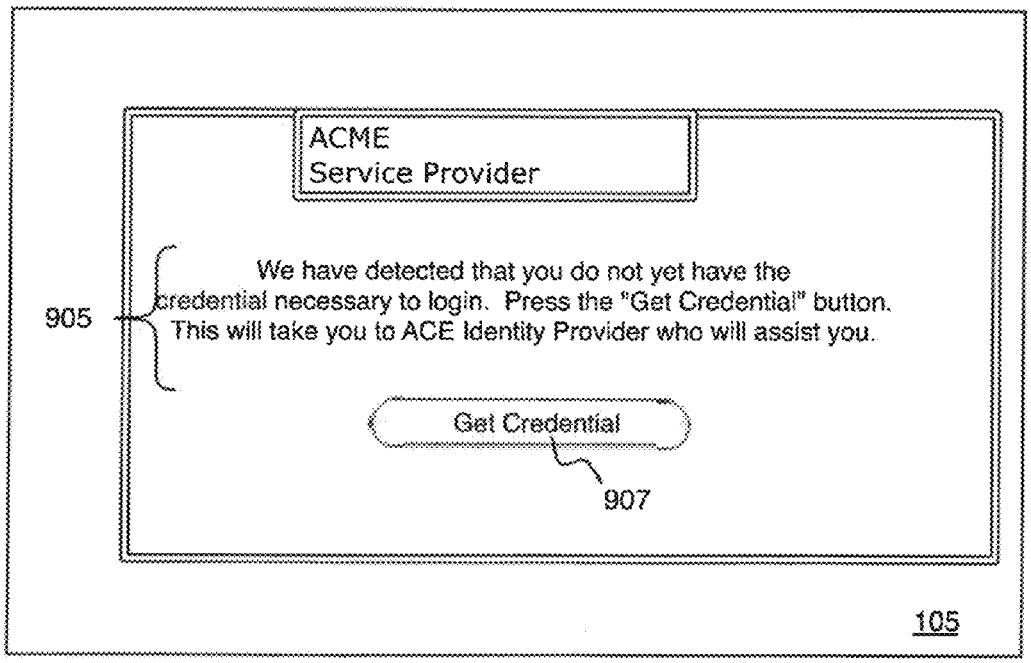

In the illustrated scenario the security device 109, which may be a smart card, does not have the credential (token) and responds with a message 805 to that effect. This causes the SP 115 to produce an indication that a credential 503 should be generated in conjunction with an identity provider 119. An example of this is illustrated in FIG. 9*b*. An information text 905 is displayed and a button 907 is provided for the user to proceed. Alternatively, these steps occur automatically without direct interaction with the user. In yet another alternative, the SP 115 informs the user to get a credential from the identity provider 119.

Step 807: The SP 115 directs the user to get the credential dynamically by sending a message to do so to the browser 103, e.g., as shown in FIG. 9*b*. This task is accomplished by a redirect (step 809) from the SP 115 to the separator 117 and a second redirect (step 815) from the separator 117 to the IdP 119.

Step: 807: Given that the security device 109 answered with a "No Token" response in step 805, the SP 115 displays a text 907 telling the user to obtain a credential 503 via the identity provider 119 and provides a the button 907 to click. When the user clicks the button, the SP 115 sends a message, which includes a link to the separator 117, to the browser 103 requesting the generation of credential.

Step 809: The browser 103 redirects the credential-generation request by sending the request to the separator 117, step 811. When the separator 117 receives the request 811 from the browser 103, the separator 117 responds with a direction to the browser 103 transfer control to the identity provider 119. From the perspective of the identity provider 119, the request was originated from the separator 117.

Thus, the on-demand credential issuance flow requires redirections between three parties, here identified as SP 115, separator 117 and IdP 119. Existing standard protocols, such as SAML 2.0 or WS_* may be used for this purpose, however the standard protocols do not provide the privacy-preserving features desired in a privacy system. In a preferred embodiment, redirection via the separator 117 operates to better protect the privacy of the user. HTTPS should be used to ensure the confidentiality and integrity of the communications between the different Internet nodes.

Figure 9C:
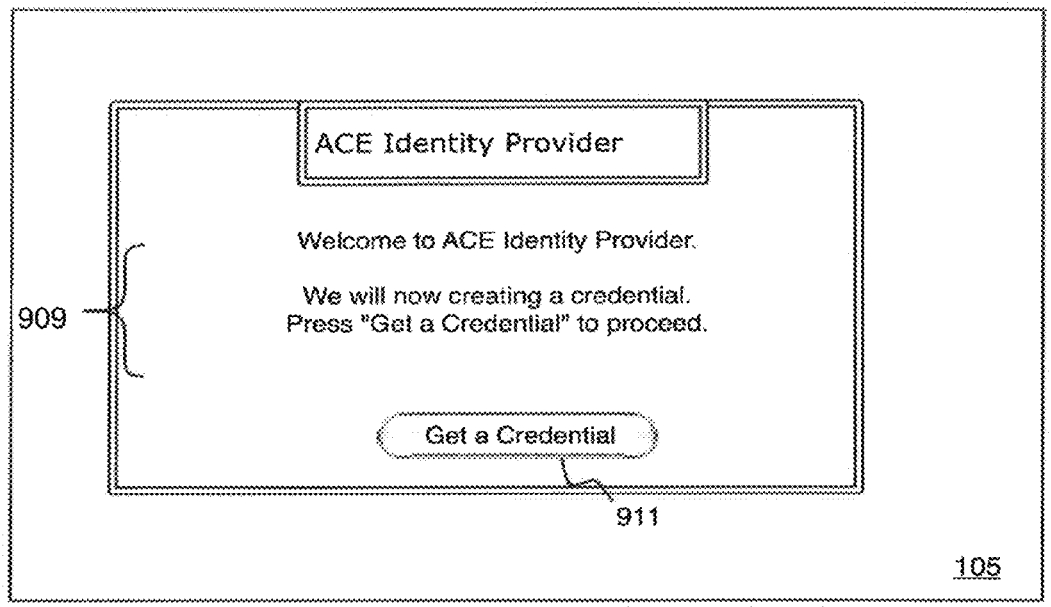

Step 813: The separator 117 sends the request without the source-identifying feature back to the browser 103 for a second redirect, step 815, this time to the IdP 119, step 817. FIG. 9*c* illustrates an example landing-page at the identity provider 119 with an invitation text 907 to the user 101 to generate a credential and a button 911 to click to start that process.

Step 819: The IdP 119 authenticates the user 101, e.g., through the security device via the browser 103.

Step 821: The IdP 119 and the security device 109 execute the token issuance protocol. The issuance protocol is an exchange between the IdP 119 and the security device 109. The IdP 119 verifies and attests to the validity of attributes that the user 101 may later need to prove. The IdP 119 already knows, through the issuance protocol exchange, the selected attribute values as the IdP 119 must be equipped to attest to their veracity. However, the IdP 119 is never made aware of the token identifier that the security device 109 associates with the credential 503, also referred to as the token.

Step 823: The security device 109 generates and stores the credential 503 (e.g. U-Prove token, idemix credential) and returns a status message, step 825, to the IdP indicating the completion of the generation of the credential 503.

In steps 827-835, the IdP 119 conveys the token issuance status to the SP 115, again through the double redirect process as outlined above but in reverse order, by using the separator 117. First, from the IdP 119 to the separator 117 via the browser 103, steps 827, 829, and 831, and then from the separator 117 to the SP 115 via the browser 103, steps 833, 835, and 837.

Figure 9D:
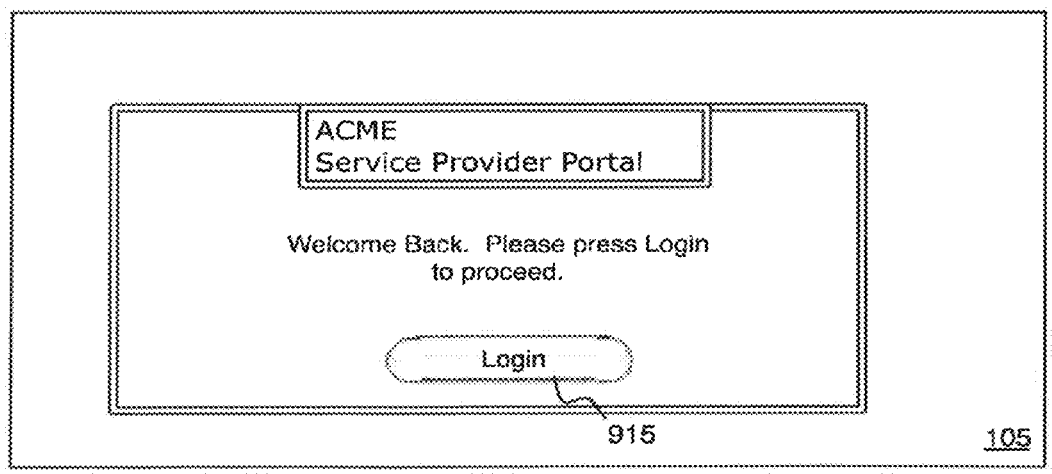

Step 839: In the event the status is OK, i.e., the token-issued message is correctly received by the SP 115 and indicates to the SP 115 that a valid credential has been properly generated, the SP 115 repeats the request for a presentation token 507 from the user 101. The request is received by the browser 103 and handled by the security device 109. FIG. 9*d* illustrates the interaction with the user 101 from the service provider to create the presentation token. The service provider 115 presents a button 915 asking the user to present the presentation token. Clicking on the button 915 sends the message 840 to the security device 109 requesting the security device 109 to generate the presentation token according to the policy of the service provider 109.

In step 841, the security device 109 generates the proof (presentation token 507). In the case of U-Prove, the proof is referred to as presentation proof or, in the case of idemix, a transformation of the idemix credential into a credential that only contains the subset of the information in the credential to which the user must attest.

In step 843, the security device 109 sends the presentation token 507 to the SP 115. For example, in the case of U-Prove the browser and the SP 115 execute a presentation protocol, which includes proving attributes that are part of the policy of the SP and includes the identity provider's signature, a token-specific public key of the token, and a response to a presentation challenge from the SP 115.

In step 845, the SP 115 verifies the presentation token 507. If the presentation token is satisfactory, the SP 115 provides services as requested to the user, Step 847.

For the redirect operations to function, the separator 117 should be able to associate token requests with the appropriate SPs 115. A straightforward way is for the separator 117 to keep a map of requests and SPs. Such an approach may be vulnerable to Denial of Service attacks. Alternatively, the separator 117 can encode the SP 115 identifying information in the request to IdP 119 in such a way that only the separator 117 can recover the information, for example, by encryption. Another alternative is for the separator 117 to write a cookie onto the user's computer 103 and read the cookie later when the separator needs to know the originating SP 115.

The high level flow in FIG. 8 applies to various privacy enhancing technologies such as U-Prove, idemix, or others, although these technologies differ in their underlying cryptography, issuing protocol, presentation protocol, policy specification, and token format.

With respect to the on-demand flow, linking of the token issuance and first use of the token is potentially possible, if the IdP 119, the SP 115, and the separator 117 (trusted $3^{rd}$ party) all collude and do a time correlation. However, the introduction of the separator 117 makes it much more difficult to collude due to the existence of the $3^{rd}$ party. Furthermore, the linking is much harder than the Microsoft's user agent approach, where the user agent knows much information about the transaction, e.g., which user, which IdP, which SP, what credentials, and at what time. The separator 117 knows nothing about users or their credentials, serving only as an opaque conduit for the process.

From the foregoing it will be apparent that a technology has been presented that provides a convenient method for the practical usage of privacy-preserving credentials in the Internet environment, with which users can dynamically obtain the privacy-preserving credentials when needed without losing convenience and privacy.

Although specific embodiments of the invention have been described and illustrated, the invention is not to be limited to the specific forms or arrangements of parts so described and illustrated.

The invention claimed is:

1. A method for authenticating a user, operating a web application on a host computer, to a web-based service of a service provider, comprising:

receiving, by the web application from the service provider, a request to present a credential indicative of satisfying an access requirement of the service provider;

forwarding the request to present a credential, by the web application, to a security device connected to the host computer;

if the security device has possession of a verifiable credential proving that an identity provider vouches for the satisfaction of the access requirement, presenting a presentation token to the service provider, the presentation token providing proof of the possession of a verifiable credential indicative of satisfying the access requirement of the service provider;

if the security device is not in possession of the verifiable credential, operating the service provider to transmit a first request to the web application in which the web application is requested to obtain the verifiable credential by displaying a user interface directing the user to the identity provider;

in response to receiving the first request and user indication to proceed to the identity provider to obtain the verifiable credential, operating the web application to redirect the first request received from the service provider to the identity provider via a separator, by:
  transmitting the first request from the web application to the separator without identifying the user;
  operating the separator to transmit a second request for the verifiable credential to the identity provider without identifying the service provider as originator;

operating the identity provider and the security device associated with the user in response to the second request:
  to engage in a privacy-preserving credential creation exchange in cooperation with the identity provider including verification and attestation by the identity provider of validity of attributes that the user needs to prove to the service provider to satisfy the access requirement of the service provider; operating the security device:
  to generate the presentation token from the privacy-preserving credential; and
  to present the presentation token to the service provider as proof of the validity.

2. The method for authenticating a user according to claim 1, wherein the first request is preceded by operating the service provider to request proof of an attribute from the user; and the method further comprises:
  transmitting a token-issued status-message from the identity provider to the web application;
  operating the host computer to redirect the token-issued status-message to the separator;
  operating the separator to redirect the token-issued status-message to the service provider via the host computer; and wherein the step of operating the security device to generate the presentation token from the privacy-preserving credential is preceded by operating the service provider, in response to receiving the token-issued status-message, to repeat the request for proof of an attribute from the user.

3. The method for authenticating a user according to claim 2, further comprising:
  operating the service provider to verify the presentation token and to provide access to the web-based service.

4. The method for authenticating a user according to claim 1, further comprising operating the security device to store the privacy-preserving credential or the presentation token.

5. The method for authenticating a user according to claim 1, wherein the security device is a smart card.

6. The method for authenticating a user according to claim 1, wherein the privacy-preserving credential is a U-Prove privacy-preserving credential.

7. The method for authenticating a user according to claim 1, wherein the privacy-preserving credential is an Identity Mixer (idemix) credential and the presentation token is a transformation of the idemix credential.

8. A system for protecting privacy of a user of online information services, comprising:
- a host computer operating under a control of a web application by which the user accesses a web service executing on a server of a service provider;
- a personal security device connected to the host computer and programmed to generate and store privacy-preserving credentials and to generate presentation tokens from the privacy-preserving credentials in response to receiving a request including a policy of the web service;
- wherein the service provider is programmed to generate a credential generation request that redirects to a separator via the web application executing on the host computer;
- wherein the separator comprises a web server that is programmed to receive the credential generation request and to create a second credential generation request, wherein the separator returns the second credential generation request to the web application and wherein the second credential generation request redirects the web application to an identity provider; and
- wherein the identity provider comprises a second web server operable, in response to the second credential generation request, to engage in a credential generation protocol with the personal security device including verification and attestation by the identity provider of validity of attributes that the user needs to prove to the service provider to satisfy an access requirement of the service provider.

9. A web server computer having a processor and a memory, the memory comprising instructions to cause the web server to receive a first request to generate a privacy-preserving credential from a web browser wherein the first request originates with a service provider and is redirected to the web server via the web browser executing on a host computer; in response to receiving the first request to generate the privacy-preserving credential, creating a response in the form of a second request to generate the privacy-preserving credential wherein the second request redirects the web browser to an identity provider directing the identity provider to engage in a credential issuance protocol with a personal security device connected to the host computer; and transmitting the second request to the web browser in response to the first request.

10. The web server computer according to claim 9, further comprising instructions to cause the web server to receive a first token-issued status message from the identity provider transmitted via the web browser and in response to receiving the token-issued status message, creating a second token-issued status message and transmitting the second token-issued status message to the web browser wherein the second token-issued message is designed to redirect to the service provider thereby indicating to the service provider that the personal security device has generated the privacy-preserving credential.

* * * * *